United States Patent
Gammie et al.

(10) Patent No.: US 7,793,119 B2
(45) Date of Patent: Sep. 7, 2010

(54) ADAPTIVE VOLTAGE SCALING WITH AGE COMPENSATION

(75) Inventors: Gordon Gammie, Plano, TX (US);
Alice Wang, Richardson, TX (US);
Hugh Thomas Mair, Fairview, TX (US)

(73) Assignee: Texas Instruments Incorporated, Dallas, TX (US)

( * ) Notice: Subject to any disclaimer, the term of this patent is extended or adjusted under 35 U.S.C. 154(b) by 786 days.

(21) Appl. No.: 11/643,194

(22) Filed: Dec. 21, 2006

(65) Prior Publication Data
US 2008/0155282 A1    Jun. 26, 2008

(51) Int. Cl.
*G06F 1/00*     (2006.01)
*G06F 1/32*     (2006.01)
*G06F 17/50*    (2006.01)

(52) U.S. Cl. .......................... 713/300; 713/320; 716/1
(58) Field of Classification Search ................ 713/300
See application file for complete search history.

(56) References Cited

U.S. PATENT DOCUMENTS

| | | | |
|---|---|---|---|
| 5,204,618 A * | 4/1993 | Matsuoka | 324/158.1 |
| 5,451,896 A * | 9/1995 | Mori | 327/543 |
| 5,712,859 A * | 1/1998 | Hori et al. | 714/724 |
| 6,967,522 B2 | 11/2005 | Chandrakasan et al. | |
| 7,005,871 B1 * | 2/2006 | Davies et al. | 324/763 |
| 7,148,755 B2 * | 12/2006 | Naffziger et al. | 331/16 |
| 7,149,903 B1 * | 12/2006 | Chan et al. | 713/300 |
| 7,581,120 B1 * | 8/2009 | Hartman et al. | 713/300 |
| 2003/0204820 A1 | 10/2003 | Asano et al. | |
| 2005/0218871 A1 | 10/2005 | Kang et al. | |
| 2006/0017510 A1 | 1/2006 | Momii et al. | |
| 2006/0049886 A1 | 3/2006 | Agostinelli, Jr. et al. | |

* cited by examiner

*Primary Examiner*—Suresh K Suryawanshi
(74) *Attorney, Agent, or Firm*—Wade J. Brady, III; Frederick J. Telecky, Jr.

(57) ABSTRACT

One embodiment of the present invention includes an adaptive voltage scaling system associated with an integrated circuit (IC). The system comprises at least one target performance circuit comprising a first semiconductor material and being configured to determine at least one voltage potential in response to achieving a target performance based on an applied voltage. The system also comprises a controller configured to set an output of a variable power supply to the determined at least one voltage potential, and an aging controller configured to control the at least one target performance circuit to age the first semiconductor material at a rate that is at least substantially commensurate with a rate at which other circuitry in the IC ages.

19 Claims, 2 Drawing Sheets

ADAPTIVE VOLTAGE SCALING WITH AGE COMPENSATION

TECHNICAL FIELD

This invention relates to electronic circuits, and more specifically to adaptive voltage scaling with age compensation.

BACKGROUND

Many integrated circuits (ICs) in a given electronic device have different functions and can operate at different frequencies. Typically, all ICs and/or all parts of a given IC may receive a voltage potential that is substantially uniform. However, the market for consumer electronics is constantly improving. There is an increasing demand for smaller circuit packages that operate at increased speeds and consume less power for the purpose of conserving battery-life, such as in wireless communication applications. As such, one manner of conserving power is adaptive voltage scaling (AVS), such that different ICs, or even different portions of a single IC, can operate with a voltage that is optimized for application use. Accordingly, power is conserved in the electronic device by not applying more than sufficient power for a given one or more of the ICs, according to the application use.

Through switching of semiconductor devices, the semiconductor material from which the semiconductor devices are made ages. As the semiconductor material of the IC ages, the transistors formed therein can be subject to deleterious effects. For example, PMOS transistors can be subject to negative biased temperature instability (NBTI), such that larger DC gate-to-source voltages are required for activation of the PMOS transistors. As another example, NMOS transistors can be subject to channel hot carrier (CHC) effects, such that the NMOS transistors can be affected with higher slew, resulting in slower switching transitions at constant bias voltages. Because of the effects of semiconductor aging, higher voltage levels may be required for the transistors of the IC to operate with the same performance as during production testing. In applications where a uniform voltage is provided to all ICs or all portions of an IC, the applied voltage can be chosen to be more than sufficient for the applications by being selected for a worst case scenario at the expense of power consumption.

In addition, environmental changes and process variations may change operating characteristics for a given IC, even subsequent to production testing of the given IC. For example, differences in transistor strength and performance variations may dictate different characteristic values that affect frequency of operation from one IC to another. In addition, the process variations from one semiconductor wafer to the next may be such that operating characteristics can be significantly different for the dies on the respective wafers, and thus the resulting ICs on the respective wafers. Different characteristic values can be adjusted through operating software of a given IC. However, as the environmental changes and process variations can be very frequent and/or ubiquitous, making adjustments to characteristic values via software can be time consuming, expensive, and/or impractical.

SUMMARY

One embodiment of the present invention includes an adaptive voltage scaling system associated with an integrated circuit (IC). The system comprises at least one target performance circuit comprising a first semiconductor material and being configured to determine at least one voltage potential in response to achieving a target performance based on an applied voltage. The system also comprises a controller configured to set an output of a variable power supply to the determined at least one voltage potential, and an aging controller configured to control the at least one target performance circuit to age the first semiconductor material at a rate that is at least substantially commensurate with a rate at which other circuitry in the IC ages.

Another embodiment of the present invention includes a method for adaptively scaling voltage in an IC. The method comprises estimating a characteristic number that is associated with a target performance for the IC and adjusting the characteristic number to an adjusted characteristic number based on at least one of characterization tests and parametric tests associated with the IC. The method also comprises storing the adjusted characteristic number in a memory device and accessing the adjusted characteristic number from the memory device upon application use of the IC. The method further comprises setting at least one voltage potential of the IC based on at least one target performance circuit associated with the IC achieving the target performance based on the adjusted characteristic number. The at least one voltage potential can be substantially equal to a minimum voltage sufficient for the at least one target performance circuit to achieve the target performance.

Another embodiment of the present invention includes an adaptive voltage scaling system associated with an IC. The system comprises means for storing a characteristic number associated with a target performance of the IC and means for determining at least one voltage potential in response to achieving the target performance based on the stored characteristic number. The means for determining the at least one voltage potential can comprise a first semiconductor material. The system also comprises means for setting an output of a variable power supply to the determined at least one voltage potential, and means for aging the first semiconductor material at a rate that substantially simulates aging of other circuitry in the IC.

DETAILED DESCRIPTION

The present invention relates to electronic circuits, and more specifically to adaptive voltage scaling (AVS) with test condition optimization and age tracking. One or more ring oscillators can be implemented to determine at least one voltage potential for a given integrated circuit (IC). The at least one voltage potential can be implemented to provide power to the IC. The at least one voltage potential can be determined based on the one or more ring oscillators achieving a target performance, such as a target frequency, that is associated with a characteristic number. For example, the characteristic number can be a number of counts of oscillations of the one or more ring oscillators sampled over a given period of time.

The characteristic number can be based first on an estimate that is made prior to production testing. Additionally, the characteristic number can be adjusted during production testing based on characterization tests and parametric measurements. The adjusted characteristic number can be stored in a memory, such that it can be retrieved during application use for setting the at least one voltage potential for the IC. As such, expensive, time consuming, and/or impractical software changes need not be made to from one IC to the next. Thus, a given IC can be optimized to its respective test conditions.

In addition, a target performance circuit, such as one or more ring oscillators, can be controlled such that the transistors therein can be aged at a rate that is commensurate with aging of the semiconductor material of the IC. As an example, a NAND-gate ring oscillator can be enabled to oscillate upon application use of the IC to age the NAND-gate ring oscillator at a rate that is commensurate with aging of NMOS transistors in the IC. As another example, a NOR-gate ring oscillator can be disabled upon application use of the IC to age the NOR-gate ring oscillator at a rate that is commensurate with aging of PMOS transistors in the IC. As such, periodic AVS can be performed accurately to set the at least one voltage potential via the aged ring oscillators in such a manner as to track the age and compensate for aging effects of the semiconductor material of the IC.

Figure 1:
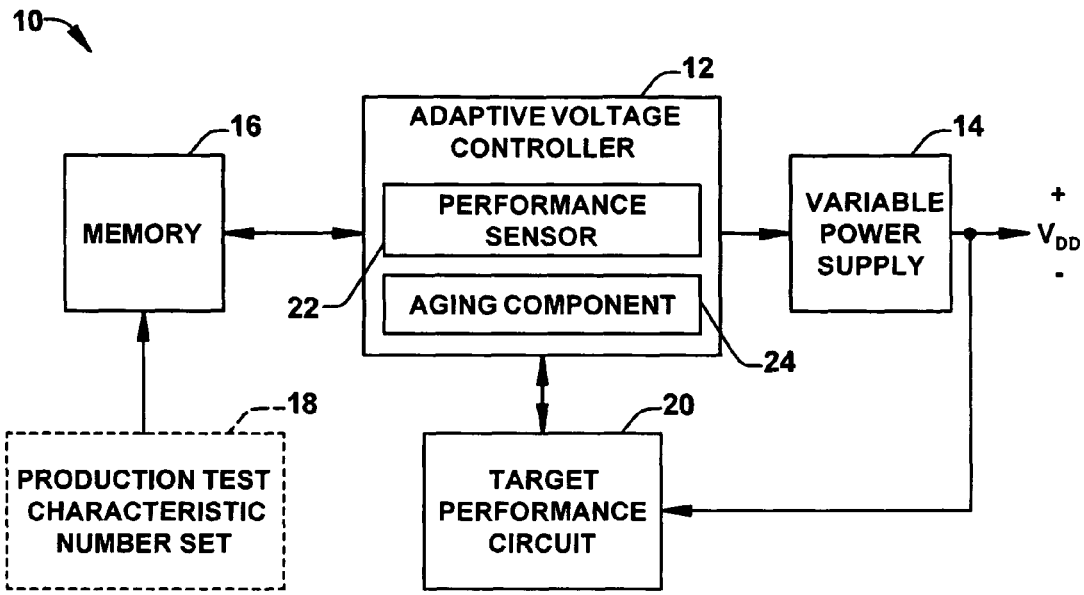
FIG. 1 illustrates an example of an adaptive voltage scaling system in accordance with an aspect of the invention.

FIG. 1 illustrates an example of an AVS system 10 in accordance with an aspect of the invention. The AVS system 10 can be implemented in an IC (not shown), having one or more voltage potentials that can be adaptively scaled within the IC. Alternatively, the AVS system 10 can be implemented for one or more separate ICs. In such implementations, the AVS system 10, can conserve power by providing an amount of voltage that is a minimum sufficient voltage for a given application use. As used herein, the term "application use" is used to describe a use of the IC for its intended function, such as in a consumer electronic device.

The AVS system 10 includes an adaptive voltage controller 12 and a variable power supply 14. The adaptive voltage controller 12 can be configured to periodically set one or more voltage potentials output from the variable power supply 14, which one or more voltage potentials are hereinafter referred to as a voltage $V_{DD}$. As an example, the variable power supply 14 can be implemented to provide the voltage $V_{DD}$ that provides power to the IC. In the example of FIG. 1, the variable power supply 14 is demonstrated as having a single output voltage $V_{DD}$. However, it is to be understood that a given variable power supply 14 can be configured to have multiple different outputs. In addition, the example of FIG. 1 is not limited to a single variable power supply 14, but can include a plurality of power supplies, each separately configurable by the adaptive voltage controller 12.

To set the voltage $V_{DD}$ of the IC, the adaptive voltage controller 12 can retrieve one or more characteristic numbers from a memory 16 upon an application use of the IC. The memory 16 can be an eFuse, a flash memory, or any of a variety of memory types. As an example, the adaptive voltage controller 12 can be configured to periodically set the voltage $V_{DD}$ based on elapsed time, or based on power-up of the IC or of an associated electronic device. In addition, different voltages for different application uses of the IC can be set concurrently or at different times. As such, the adaptive voltage controller 12 can retrieve the necessary one or more characteristic numbers from the memory 16 every time the adaptive voltage controller 12 sets the voltage $V_{DD}$.

The characteristic numbers can be representative, for example, of a number of counts to be sampled over a period of time, as will be explained in greater detail below. As such, each of the characteristic numbers can be translated into a respective target performance for the IC. As an example, the target performance can be a minimum operating frequency for one or more components or one or more critical paths of the IC. As is also described in greater detail below, the target performance can directly correspond to the voltage $V_{DD}$ to which the adaptive voltage controller 12 sets the variable power supply 14.

The one or more characteristic numbers can be initially estimated prior to production testing for the given IC. For example, a known target performance of operation, such as frequency, for the given IC can be a starting point for estimating a characteristic number. Upon testing a plurality of substantially similar ICs, and thus adjusting characteristic numbers for a subset of the plurality of substantially similar ICs, noticeable trends in adjustments to characteristic numbers can likewise be accounted for an initial estimate of the characteristic number. The given IC can then be tested based on the initial estimate of the one or more characteristic numbers.

The testing can include characterization tests, such that a determination can be made of whether a given characteristic number is suitable for a respective application. For example, a characterization test can utilize clock circuitry to determine if the IC can achieve a respective target frequency, and can also determine whether the IC achieves the respective target frequency based on the given characteristic number. The testing can also include parametric testing, such as parametric measurements associated with the IC. For example, certain parameters can be measured to determine if they fall within an acceptable range, and relative transistor strengths of the IC can be measured based on applied voltage signals. Such parametric measurements can thus also determine if an adjustment to the characteristic number is necessary. Upon completion of production testing for the given IC, the adjusted characteristic numbers comprise a production test characteristic number set 18, which are stored in the memory 16. Therefore, the AVS system 10 can be optimized for the test conditions of the IC, thus allowing uniform operating software from one IC to the next, despite chip-to-chip process variations.

The AVS system 10 includes a target performance circuit 20. Upon retrieving one or more characteristic numbers from the memory 16, the adaptive voltage controller 12 can enable the target performance circuit 20, thus controlling the target performance circuit 20 to achieve the target performance. As an example, the target performance circuit 20 can include one or more ring oscillators that can oscillate between states at a frequency that can be variable based on an applied voltage. In the example of FIG. 1, the variable power supply 14 can provide the voltage $V_{DD}$ to the target performance circuit 20, such that the adaptive voltage controller 12 can adjust the voltage $V_{DD}$ of the variable power supply 14 to adjust the performance, such as frequency, of the target performance circuit 20. The adaptive voltage controller 12 includes a performance sensor 22 configured to measure the performance of the target performance circuit 20. For example, the performance sensor 22 can include a counter, such that the adaptive voltage controller 12 can increment the counter at every oscillated state (or increment for every n state changes, where n>1) of one or more ring oscillators in the target performance circuit 20. In this example, the frequency of oscillations of the ring oscillator(s) in the target performance circuit 20 can thus be determined based on the number of counts (e.g., a count value) of the counter in the performance sensor 22 incremented over a period of time.

The adaptive voltage controller 12 can continuously adjust the voltage $V_{DD}$ until the target performance circuit 20 achieves the target performance, as determined by a respective characteristic number. As an example, the adaptive controller can increase (e.g., in discrete steps) the voltage $V_{DD}$ and sample the output of the target performance circuit 20 over the given period of time for each sequence. As such, the target performance can be achieved based on the voltage $V_{DD}$. As an example, a target frequency that results in a number of sampled counts that is substantially equal to the characteristic number can be achieved based on the voltage $V_{DD}$. As another example, the memory 16 can include a pre-set voltage, such as could also be stored in the memory 16, which can be a starting point for the adaptive voltage controller 12 to set the voltage $V_{DD}$ of the variable power supply 14. The adaptive voltage controller 12 can also include a comparator to compare the performance of the target performance circuit 20 with a given characteristic number, such that the adaptive voltage controller 12 can implement closed loop control to adjust the voltage $V_{DD}$ of the variable power supply 14 based on the performance of the target performance circuit 20 being less than or greater than the characteristic number to achieve the target performance.

In the above described manner, the adaptive voltage controller 12 can set the voltage $V_{DD}$ of the variable power supply 14 as the voltage which causes the target performance circuit 20 to achieve the target performance based on the characteristic number. Therefore, the associated IC can receive the voltage $V_{DD}$ for an application use, that application use operating at a level of performance for which the provided voltage $V_{DD}$ has been optimized for operation. As an example, the provided voltage $V_{DD}$ can be a minimum optimal voltage for the respective application use, because the voltage $V_{DD}$ is the minimum voltage for the target performance circuit 20 to achieve the target frequency in simulating the application use operating frequency. Accordingly, application use power can be conserved in the IC to conserve power consumption in the associated electronic device.

As described above, semiconductor material ages through consistent switching of the transistors made from the semiconductor material. As the semiconductor material ages, the transistors can be subject to detrimental effects, such as negative bias temperature instability (NBTI) for PMOS transistors and channel hot carrier (CHC) for NMOS transistors. These detrimental effects can be overcome by increasing bias voltages for the respective transistors. Thus, a voltage $V_{DD}$ that is set as a minimum voltage for transistors of the IC that provide the application use may no longer be sufficient to provide an appropriate operating performance, such as operating frequency, upon aging of the semiconductor material of the respective transistors of the IC. To compensate for the aging effects of the semiconductor material of the IC, the adaptive voltage controller 12 includes an aging controller 24.

The aging controller 24 is configured to control the target performance circuit 20 in such a manner as to age the target performance circuit 20 at a rate that is at least substantially commensurate with the semiconductor material of IC that is associated with the application use (e.g., critical paths of the IC). For example, the aging controller 24 can enable ring oscillators in the target performance circuit 20 to oscillate and/or hold state during application use of the IC, such that the transistors of the target performance circuit 20 age commensurate with or faster than the application use of the IC. The adaptive voltage controller 12 can adjust the voltage $V_{DD}$ (e.g., periodically) to account for the aging of the semiconductor material. For example, the target performance circuit 20 can be aged at a rate that is at least substantially commensurate with the semiconductor material of the IC, thus the voltage $V_{DD}$ can be optimized for age to achieve the target performance. As such, upon the adaptive voltage controller 12 setting the voltage $V_{DD}$ of the variable power supply 14 for a given application use, the voltage $V_{DD}$ can be optimized to provide the appropriate operating performance for the application use, even for semiconductor material of the IC that has aged. The adaptive voltage controller 12 can thus track the aging of the semiconductor material of the IC and can periodically set the voltage $V_{DD}$ for the application use of the IC.

The AVS system 10 in the example of FIG. 1 is but one example of an AVS system. As such, the AVS system 10 is not intended to be limited to the example of FIG. 1. For example, the target performance circuit 20 in the example of FIG. 1 is described by example as being one or more ring oscillators, but other types of circuits and/or oscillators can be implemented instead of ring oscillators. As such, target performance may not be limited to a target frequency, but could include any of a variety of circuit performance characteristics, and further may not be limited to just one. Furthermore, one or more of the components in the AVS system 10 can be integrated together, into the associated IC or into a separate IC. As another example, one or more of the components can be separately configured. For example, the memory 16 can be part of an operational memory, such as an SRAM, for the associated electronic device. In addition, the variable power supply 14 may be configured separately from the AVS system 10, the associated IC, and/or both. As such, the AVS system 10 can be implemented in any of a variety of different manners.

Figure 2:
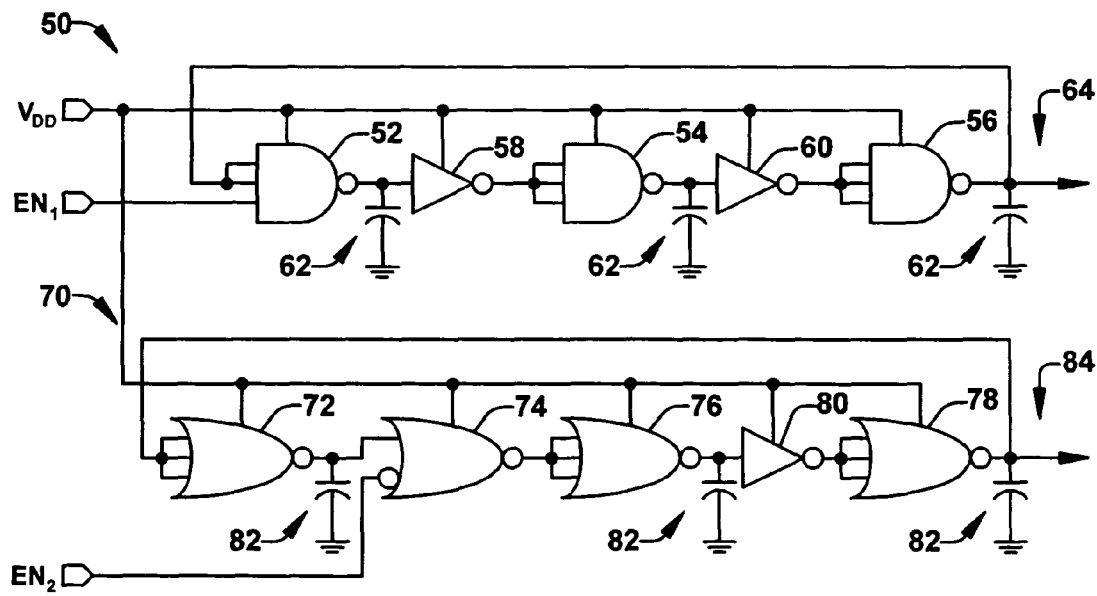
FIG. 2 illustrates an example of ring oscillators of an adaptive voltage scaling system in accordance with an aspect of the invention.

FIG. 2 illustrates an example of a first ring oscillator 50 and a second ring oscillator 70 of an adaptive voltage scaling system in accordance with an aspect of the invention. As an example, the first ring oscillator 50 and the second ring oscillator 70 can each be included in the target performance circuit 20 in the example of FIG. 1. As such, in the discussion of FIG. 2, reference is made to the above discussion of FIG. 1.

The first ring oscillator 50 includes NAND-gates 52, 54, and 56, as well as inverters 58 and 60. Each of the NAND-gates 52, 54, and 56, as well as the inverters 58 and 60, are powered by the voltage $V_{DD}$, which could be supplied from the variable power supply 14. The NAND-gates 54 and 56 each have three common inputs, such that they behave as an inverter. The NAND-gate 52 has two common inputs and an enable input $EN_1$. The first ring oscillator 50 also includes capacitors 62 interconnecting the NAND-gate 52 and the inverter 58, the NAND-gate 54 and the inverter 60, and the NAND-gates 56 and 52. The capacitors 62 can be sized to adjust the frequency of oscillation of the first ring oscillator 50, for example, to account for a worst case scenario application use frequency of the IC. The enable input $EN_1$ can be provided by the adaptive voltage controller 12 to enable the first ring oscillator 50, such that a number of oscillations can be counted at an output 64. The first ring oscillator 50 includes the NAND-gates 52, 54, and 56 such that the first ring oscillator 50 can be implemented to set the voltage $V_{DD}$ for a target operating frequency of an application use of the IC that may be specifically associated with the switching of NMOS devices.

The second ring oscillator 70 includes NOR-gates 72, 74, 76, and 78, as well as an inverter 80. Each of the NOR-gates 72, 74, 76, and 78, as well as the inverter 80, are also powered by the voltage $V_{DD}$, similar to the ring oscillator 50. The NOR-gates 74, 76, and 78 each have three common inputs, such that they behave as an inverter. The NOR-gate 72 has two common inputs and an enable input $EN_2$. The second ring oscillator 70 also includes capacitors 82 interconnecting the NOR-gates 72 and 74, the NOR-gate 76 and the inverter 80, and the NOR-gates 78 and 72. The capacitors 82 can be sized to adjust the frequency of oscillation of the second ring oscillator 70, for example, to account for a worst case scenario application use frequency of the IC. The enable input $EN_2$ can be provided by the adaptive voltage controller 12 to enable the ring oscillator 70, such that a number of oscillations can be counted at an output 84. The second ring oscillator 70 includes the NOR-gates 72, 74, 76, and 78 such that the second ring oscillator 70 can be implemented to set the voltage $V_{DD}$ for a target operating frequency of an application use of the IC that may be specifically associated with the switching of PMOS devices.

As an example, the ring oscillator 50 and the ring oscillator 70 can be configured in such a manner as to begin oscillating in response to receiving a logic high (i.e., logic 1) input at the respective enable inputs $EN_1$ and $EN_2$ from the adaptive voltage controller 12. The frequency of oscillations of each of the ring oscillator 50 and the ring oscillator 70 is adjusted based on the magnitude of the voltage $V_{DD}$. It is to be understood that, despite both the ring oscillator 50 and the ring oscillator 70 being powered by the voltage $V_{DD}$ in the example of FIG. 2, each could be powered by a separate and individually variable power supply voltage. The frequency of oscillations can be measured by the adaptive voltage controller 12 based on incrementing a counter in the performance sensor 22 for every change of state at the respective outputs 62 and 82. The resultant number of counts, sampled over a period of time, can be compared (e.g., by logic in the adaptive voltage controller 12) with one or more of the characteristic numbers for a determination of whether one or both of the ring oscillator 50 and the ring oscillator 70 achieves the target frequency based on the voltage $V_{DD}$.

In addition to the adaptive voltage controller 12 controlling $V_{DD}$ the ring oscillator 50 and the ring oscillator 70 to set the voltage $V_{DD}$ based on the ring oscillator 50 and/or the ring oscillator 70 for achieving the target frequency, the aging controller 24 can also enable and/or disable the ring oscillator 50 and the ring oscillator 70. For example, the aging controller 24 can selectively enable and disable each of the ring oscillator 50 and the ring oscillator 70 to age the semiconductor material of which the transistors in the ring oscillators 50 and 70 are made at a rate that is substantially similar to the semiconductor material of which the transistors for the application use of the IC are made.

As an example, because the deleterious effects of aging in NMOS transistors occur when they are held in an activated state, the aging controller 24 may provide a logic high input at the enable input $EN_1$ during application use of the IC, thus enabling the ring oscillator 50. Accordingly, the ring oscillator 50 may be enabled at substantially all times other than, for example, while the IC is in a sleep mode to age the ring oscillator 50 substantially at the same rate as NMOS transistors in the IC. As another example, because the deleterious effects of aging in PMOS transistors occur when they are held in a deactivated state, the aging controller 24 may provide a logic low input at the enable input $EN_2$ during application use of the IC, thus disabling the ring oscillator 70.

In addition, the aging controller 24 may disable the ring oscillator 70 upon a specific logic state of the output 82, such that the ring oscillator 70 is held at a static state when the PMOS transistors that such oscillator includes are deactivated. For example, the NOR-gates 76 and 78 can be configured larger than the NOR gates 72 and 74, and the ring oscillator 70 can be disabled at a time that the PMOS transistors in the NOR-gates 76 and 78 are deactivated, such that the NOR-gates 76 and 78 can be aged in a worst case scenario for tracking the age of the semiconductor material of the IC. Accordingly, the ring oscillator 70 may be disabled at substantially all times other than, for example, an AVS mode, when the adaptive voltage controller 12 sets the voltage $V_{DD}$, to age the ring oscillator 70 at the same rate as PMOS transistors in the IC. It is to be understood that various portions of the associated IC may age at different rates. Thus, the aging controller 24 can control the ring oscillators 50 and 70 to age based on a worst case aging scenario of the associated IC, such that performance of the associated IC is not compromised.

It is to be understood that the ring oscillators 50 and 70 are not intended to be limited to NAND-gates and NOR-gates, respectively, as demonstrated in the example of FIG. 2. For example, both the first ring oscillator 50 and the second ring oscillator 70 can be configured to include additional gates than those demonstrated in the example of FIG. 2. In addition, any of a variety of other types of ring oscillators (e.g., odd number of inverters) can be implemented to set the voltage $V_{DD}$ of the variable power supply 14. In addition, the target performance circuit 20 in the example of FIG. 1 can include more or less ring oscillators than two ring oscillators, such as the ring oscillator 50 and the ring oscillator 70 in the example of FIG. 2.

Figure 3:
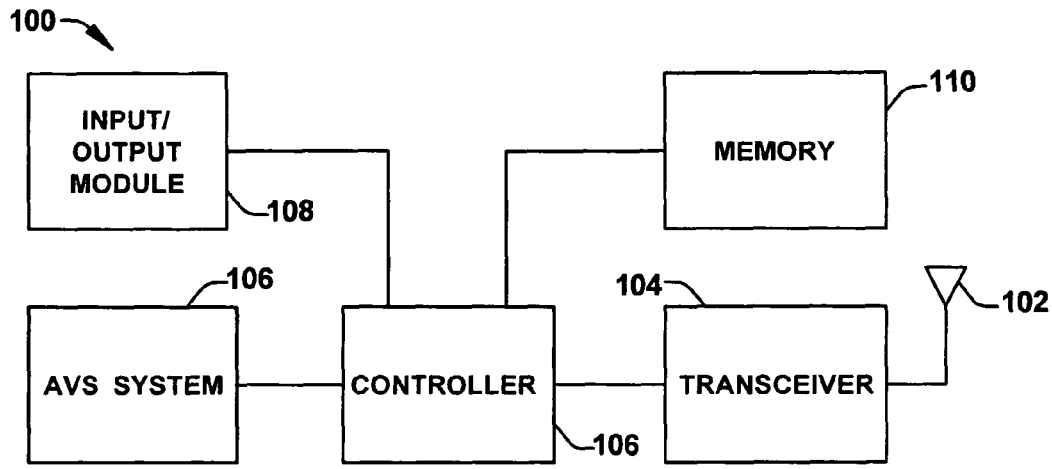
FIG. 3 illustrates a block diagram of a mobile communication device including an adaptive voltage scaling system in accordance with an aspect of the invention.

An AVS system that is configured to set a voltage for one or more components of an IC based on one or more ring oscillators achieving a target frequency, such as the AVS system in the example of FIG. 1, can be utilized in any of a variety of applications. An example of such an application is depicted in FIG. 3. FIG. 3 illustrates an example of a mobile communication device (MCD) 100, such as a cellular telephone. Wireless signals are transmitted from and received at an antenna 102. The MCD 100 also includes a transceiver 104, a controller 106, and an input/output module 108, which could include a microphone and receiver. Wireless signals received at the antenna 102 are demodulated at the transceiver 104 and sent to the controller 106, such that the signals can be properly interpreted by the controller 106, such as voice data for a user of the MCD 100 at the input/output module 108. Similarly, user voice signals from the input/output module 108 can be sent to the transceiver 104 via the controller 106 to be modulated into a wireless signal that is transmitted from the antenna 102.

The MCD 100 also includes a memory system 110. The memory system could include both volatile and non-volatile memory. The non-volatile memory could include FLASH or other memory that stores information, such as stored phone numbers and digital photographs and operating parameters. The volatile memory, which could include one or more memory circuits, could be used to store connection information, such as control information between the MCD 100 and a cell tower that is serving the MCD 100. The memory system 110 can also store a characteristic number set of one or more characteristic numbers that have been determined during production testing. For example, initial characteristic number estimates may have been tested and adjusted during production testing, based on characterization tests and/or parametric measurements of at least one IC, such as the controller 106. The adjusted characteristic numbers can thus be saved in the memory system 110, or in another associated memory.

The MCD 100 further includes an AVS system 112. The AVS system 112 can be implemented to set one or more voltages of at least one power supply to provide power for the at least one IC, such as the controller 106. It is to be understood that the AVS system 112 could be configured integral with the controller 106. The AVS system 112 can periodically set or adjust the voltage based on enabling a target performance circuit to achieve a predetermined target performance. The applied voltage that is the minimum sufficient to achieve the target performance that is associated with an optimum operating voltage. In addition, to ensure that the optimum voltage for the at least one IC does not become insufficient due to aging effects, the AVS system 112 can be configured to age the target performance circuit (as described herein), such that the determine optimum voltage can be the minimum voltage for an application use of the IC, such as an operating frequency, even upon aging.

Figure 4:
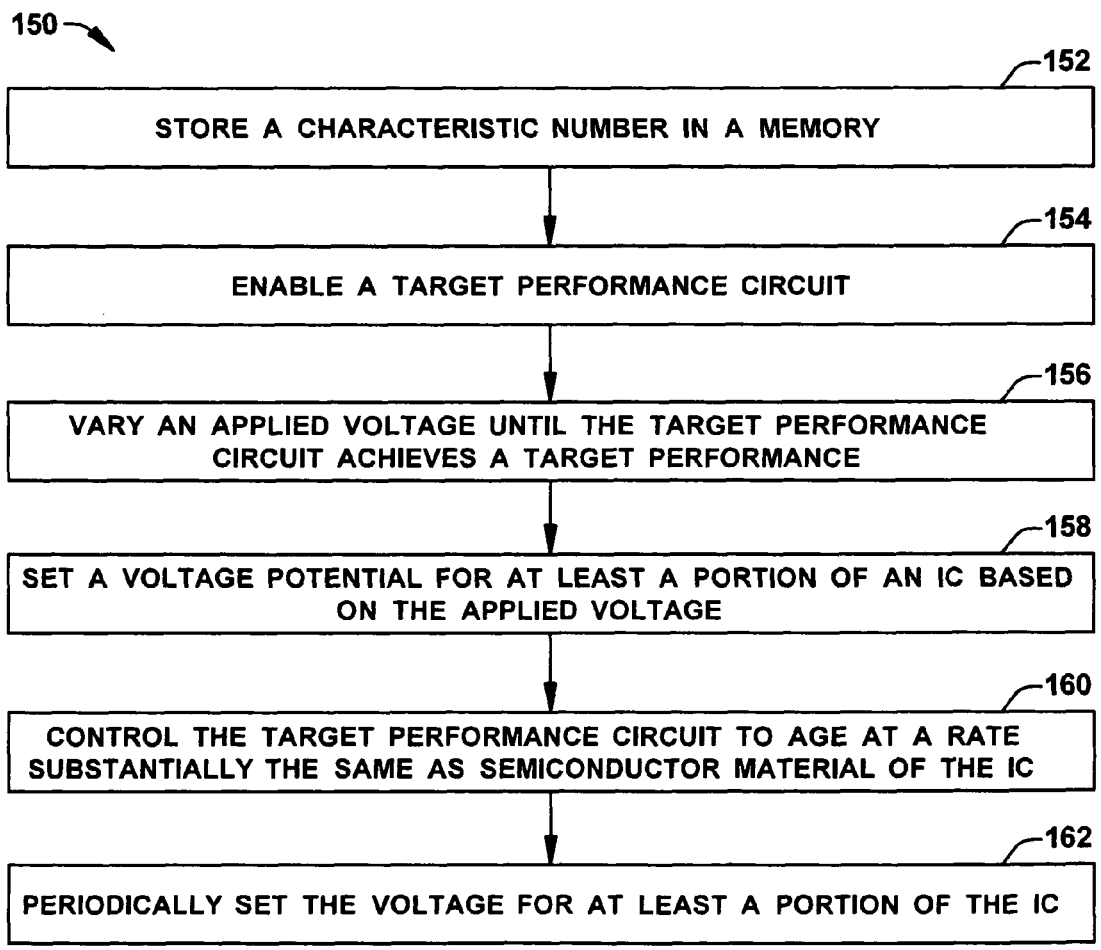
FIG. 4 illustrates a method for adaptively scaling voltage in an IC in accordance with an aspect of the invention.

In view of the foregoing structural and functional features described above, certain methods will be better appreciated with reference to FIG. 4. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., a computer a device, or an ASIC), software (e.g., as executable instructions running on one or more processors), or any combination of hardware and software.

FIG. 4 illustrates a method 150 for adaptively scaling a voltage associated with an IC in accordance with an aspect of the invention. At 152, a characteristic number is stored in a memory. The characteristic number can be a number that is associated with a target performance, such as a target frequency, such that it can represent a number of counts sampled over a period of time. The target frequency can be a target frequency of operation of the IC in an application use. The characteristic number can be initially estimated, and can be adjusted based on characterization tests and parametric measurements. The memory can be a non-volatile memory that can be separate from both the IC and an AVS system configured to perform the method 150 or such memory can be part of the IC or the AVS. At 154, a target performance circuit is enabled. The target performance circuit can include both a NAND-gate ring oscillator and a NOR-gate ring oscillator. At 156, an applied voltage is adjusted until the target performance circuit achieves the predetermined target performance. For example, the target performance can be a target frequency, such that at least one ring oscillator can be provided with the variable applied voltage, such that the frequency of oscillations is variable based on the variable applied voltage.

At 158, a voltage potential is set for at least a portion of an IC based on the voltage applied to the target performance circuit. The set voltage potential can be the minimum voltage sufficient for ring oscillators to achieve the target frequency. Thus, the voltage potential can be a minimum voltage sufficient for an operating frequency of an application use of the IC. At 160, the at least one ring oscillator is controlled to age at a rate that is substantially the same as the semiconductor material of the IC. For example, a NAND-gate ring oscillator can be enabled to oscillate at substantially all times of application use of the IC. As another example, a NOR-gate ring oscillator can be disabled to hold an output state at substantially all times of application use of the IC. At 162, the voltage potential is periodically set for at least the portion of the IC. As the target performance circuit has been aged at a rate that is substantially the same as the semiconductor material of the IC, the periodically set voltage can be a minimum voltage for operating performance, such as operating frequency, of the application use of the IC, even upon the semiconductor material of the IC aging.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. An adaptive voltage scaling system associated with an integrated circuit (IC), the system comprising:
    at least one target performance circuit comprising a first semiconductor material and being configured to determine at least one voltage potential in response to achieving a target performance based on an applied voltage;
    a first controller configured to set an output of a variable power supply according to the determined at least one voltage potential; and
    an aging controller configured to control the at least one target performance circuit to age the first semiconductor material at a rate that is at least substantially commensurate with a rate at which other circuitry in the IC ages.

2. The system of claim 1, wherein the target performance is a target frequency associated with a predetermined characteristic number, the predetermined characteristic number being determined upon at least one of characterization tests and parametric measurements of the IC.

3. The system of claim 2, further comprising memory configured to store the predetermined characteristic number, the controller being configured to retrieve the characteristic number from the memory and enable the at least one target performance circuit for the determination of the at least one voltage potential.

4. The system of claim 1, wherein the at least one target performance circuit comprises a first ring oscillator and a second ring oscillator.

5. The system of claim 4, wherein the other circuitry in the IC comprises a plurality of NMOS transistors and a plurality of PMOS transistors, and wherein the aging controller enables the first ring oscillator upon application use of the IC to age the first ring oscillator at a rate that is at least substantially commensurate with the plurality of NMOS transistors, and wherein the aging controller disables the second ring oscillator upon application use of the IC to age the second ring oscillator at a rate that is at least substantially commensurate with the plurality of PMOS transistors.

6. The system of claim 5, wherein the first ring oscillator comprises a plurality of common input connected NAND-gates, one of the plurality of NAND-gates having an enable input, and wherein the second ring oscillator comprises a plurality of common input connected NOR-gates, one of the plurality of NOR-gates having an enable input.

7. The system of claim 5, wherein the second ring oscillator comprises a second plurality of PMOS transistors, and wherein the controller disables the second ring oscillator upon at least a portion of the second plurality of PMOS transistors being deactivated.

8. A mobile communication device comprising the system of claim 1.

9. A method for adaptively scaling voltage in an integrated circuit (IC), the method comprising:
    estimating a characteristic number that is associated with a target performance for the IC;
    adjusting the characteristic number to an adjusted characteristic number based on at least one of characterization tests and parametric tests associated with the IC;
    storing the adjusted characteristic number in a memory device;

accessing the adjusted characteristic number from the memory device upon application use of the IC; and setting at least one voltage potential of the IC based on at least one target performance circuit associated with the IC achieving the target performance based on the stored adjusted characteristic number, the at least one voltage potential being substantially equal to a minimum voltage sufficient for the at least one target performance circuit to achieve the target performance;

wherein the at least one target performance circuit comprises a first semiconductor material, the method further comprising controlling the at least one target performance circuit during application use of the IC, such that the at least one target performance circuit ages at a rate that is at least substantially commensurate with a rate at which other circuitry in the IC ages.

10. The method of claim 9, wherein setting the at least one voltage potential of the IC further comprises setting an output of at least one variable power supply associated with the IC according to the at least one voltage potential.

11. The method of claim 9, wherein setting the at least one voltage potential of the IC further comprises periodically setting the at least one voltage potential of the IC during application use of the IC based on the adjusted characteristic number.

12. The method of claim 9, wherein the at least one target performance circuit comprises a first ring oscillator and a second ring oscillator, and wherein the other circuitry in the IC comprises a plurality of NMOS transistors and a plurality of PMOS transistors, the method further comprising:

enabling the first ring oscillator upon application use of the IC to age the first ring oscillator at a rate that is at least substantially commensurate with the plurality of NMOS transistors; and disabling the second ring oscillator upon application use of the IC to age the second ring oscillator at a rate that is at least substantially commensurate with an aging the plurality of PMOS transistors.

13. The method of claim 12, wherein the second ring oscillator comprises a second plurality of PMOS transistors, and wherein disabling the second ring oscillator comprises disabling the second ring oscillator upon at least a portion of the second plurality of PMOS transistors being deactivated.

14. A mobile communication device configured to implement the method of claim 9.

15. An adaptive voltage scaling system associated with an integrated circuit (IC), the system comprising:

means for storing a characteristic number associated with a target performance of the IC;

means for determining at least one voltage potential in response to achieving the target performance based on the stored characteristic number, the means for determining the at least one voltage potential comprising a first semiconductor material;

means for setting an output of a variable power supply according to the determined at least one voltage potential; and means for aging the first semiconductor material at a rate that substantially simulates aging of other circuitry in the IC.

16. The system of claim 15, wherein the characteristic number is determined through at least one of characterization tests and parametric tests associated with the IC.

17. The system of claim 15, wherein the other circuitry in the IC comprises a plurality of NMOS transistors and a plurality of PMOS transistors, and wherein the means for determining the at least one voltage potential comprises a first means and a second means, the first means being enabled upon application use of the IC to age the first means at a rate that is at least substantially commensurate with the plurality of NMOS transistors, and wherein the second means is enabled upon application use of the IC to age the second means at a rate that is at least substantially commensurate with the plurality of PMOS transistors.

18. The system of claim 17, wherein the second means for determining the at least one voltage potential comprises a second plurality of PMOS transistors, and wherein the second means for determining the at least one voltage potential is disabled commensurate with deactivation of at least a portion of the second plurality of PMOS transistors.

19. A mobile communication device comprising the system of claim 15.

* * * * *